April 16, 1963  R. N. BALL  3,085,881
METHOD OF TREATING RIPE OLIVES
Filed Jan. 27, 1959
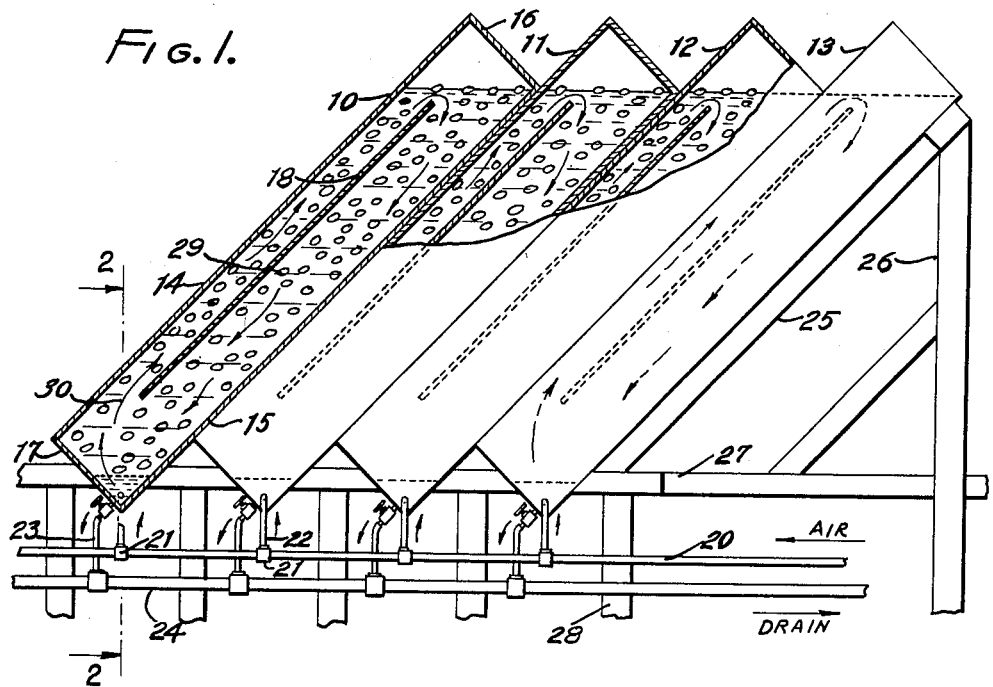
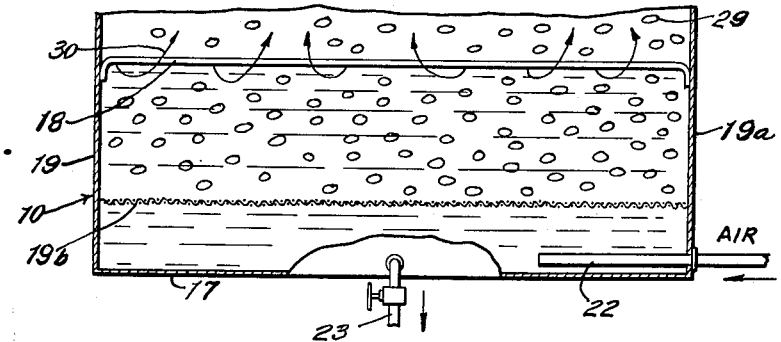
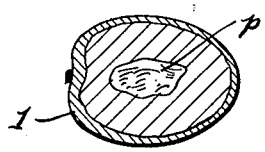
FIG. 3.
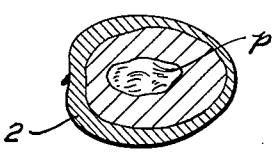
FIG. 4.
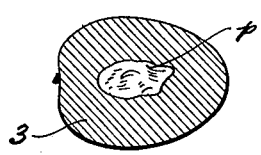
FIG. 5.
INVENTOR,
RICHARD N. BALL;
BY
ATTORNEY

United States Patent Office 3,085,881
Patented Apr. 16, 1963

3,085,881
METHOD OF TREATING RIPE OLIVES
Richard N. Ball, Visalia, Calif.; Mildred Starr Ball, executrix of said Richard N. Ball, deceased, by decree of distribution to said Mildred Starr Ball
Filed Jan. 27, 1959, Ser. No. 789,428
3 Claims. (Cl. 99—103)

The present invention relates to a method or process as well as a means for carrying out said method or process in the treatment of ripe olives.

As understood in the industry, olives contemplated by my invention are known variously as California ripe olives, California style ripe olives and black ripe olives to distinguish such olives from green olives or Spanish style green olives. Olives which remain on a tree are known as unprocessed olives and not as green olives, while the word ripe refers to a style of cure rather than that the olives when picked were ripe.

It has long been the practice in the art of treating olives to provide large vats or tanks within which the olives are placed to a considerable depth and covered with a solution of lye together with air exposures. As a rule from 12 to 21 days are required for a curing process depending upon the variety of the olive, the curing method employed and the condition of the weather as well as other factors.

A second method of treating olives after they have been freshly picked is to place the olives in a salt brine from 4% to 8% and to allow a lactic acid fermentation to take place, the olives of course, as well as the solution, being in a suitable storage tank. This permits the olives to be kept until such a time as the curing is to take place, and as a rule the olives are cured within 60 to 90 days or may be kept as long as a year or more before treating and canning.

In processes known to the inventor for the treatment of olives, lye such as sodium hydroxide of varying strength from about .5% to 1.8% is generally employed with a temperature in the vat or curing rooms which may vary between 40° F. to 100° F. or over. As a rule, the lyes are made fresh each time or saved and fortified to the needed strength and the number of lyes used may vary from any number, usually 4 to 8, or more. Exposures must be made of the olives between lyes for the purpose of getting air into the olives to produce a dark brown or black color in the meat under the olive skin, and this exposure time varies from twelve to seventy-two hours in the majority of cases. Several methods of exposing to air are employed such as aerating the water or by allowing the olives to stand dry in vats. The washing time for the olives after a complete lye penetration may vary from two to seven, or more days, in order to remove the lye.

The brine of a strength of 1% to 3% may be applied from one to three times before canning in the usual manner, with or without heating. Thus the color of the olive may vary from a light brown to a jet black for the finished product.

The varying schedules as just set forth, result from variations, as previously stated, in variety, source of raw material, time of harvest, temperature of vat room, water hardness and temperature, types of vats used, and most of all the individual experience or ideas of the processer. The reason for multiple lye treatments with alternate exposures to air is to obtain a good dark color in the olive. However, it is generally known that the color substances in the olive are soluble in lye unless they are first exposed to air in an alkaline medium. The olive then absorbs oxygen and the color becomes more insoluble in lye and water. Of course, it is generally known that the surface of the olive or the skin with the layer of cutin, protects the olive on the trees from moisture loss during hot or dry weather, and this layer of cutin prevents even penertration of lye into the olive. The result it that the processer goes through a series of steps constituting a first lye solution for the olives to obtain some penetration into the olive followed by exposure of the olives to air for varying degrees of time, usually twenty-four to forty-eight hours, followed by further lye treatments and exposures, finally terminating in water changes until all lye is removed. It is, of course, essential that complete hydrolysis and destruction of the bitter principle of the olive be effected to insure a good flavored product. Thereafter follows the placing of the olives in salt brine as I have previously pointed out.

An object of the present invention is to reduce by half, or more, the time required to treat olives using the methods or process above outlined, or similar processes.

A further object of the invention is to improve the color and uniformity of color in the olive.

A further object is to improve the texture, and flavor, of the olive.

A further object is to completely eliminate spoilage during processing of the olive.

A further object is to provide a process for the treatment of olives which requires little change in equipment now generally employed for this process.

A further object is to reduce the amount of skilled supervision as presently required in the processing of olives.

A further object is to reduce sorting costs as there is no spoilage of olives, nor color to sort out, the color being generally uniform in all olives processed in accordance with my invention.

The industry has long recognized that if a one color lye could be applied and could cut through the skins of all olives without penetrating softer or less resistant olives but a slight amount, up to 1/8" or less, that any following air exposure would establish the maximum color in all olives, and a subsequent final or "pit" lye would complete the process thus saving the time and work necessary to apply any further lyes. My invention accomplishes substantially this very desired process.

In the drawing:

FIGURE 1 is a fragmentary transverse sectional view of tanks or vats which may be utilized in the efficient handling of the lye process or method for treatment of olives;

FIGURE 2 is an enlarged transverse sectional view, partly in fragment, taken substantially on line 2—2 of FIGURE 1; and FIGURES 3, 4 and 5 jointly represent an olive which is treated in accordance with my process or method, the cross sections showing three stages of lye penetration of the olive tissue.

In the following description of my invention, I will first set forth my process or method of treating ripe olives, followed by a description of an improved vat which may be employed in the carrying out of my process.

In the carrying out of my process or method for the treatment of ripe olives, I first rinse the olives, the skin structure of which is intact, in fresh water. The first step in my process is to remove all wax from the olive which in the case of the olive is a layer of cutin. This wax removal is accomplished through the use of an alkaline solution having a pH of approximately 12 (which pH reduces to 9 or 10 during the treatment) for the purpose of saponifying the wax without the solution penetrating the skin of the olive.

I may use for the alkaline solution, sodium hydroxide and sodium tri-poly-phosphate. When four grams of each of these chemicals are utilized per gallon of water the pH will be found to approximate 12. As time, temperature, and the pH of the solution is important, the solution should be maintained at a temperature, through the use of steam heat, between 120° to 140° F. In addition, this solution should be constantly circulated by injection of air into the solution preferably at the base of the tank so that there is an air lift effect which not only circulates the olives under treatment but the solution as well.

It is important for the processor to determine that during treatment, the alkaline solution is strong enough to saponify or remove the wax, but not strong enough to either penetrate the skin or damage the tissue of the olive. While all of the wax may not be removed, the greater part thereof is dissolved from the olives and an even deposit of the wax in alkaline solution is made on all of the olives. I have found that even the stem ends, where no wax is present, when the fruit is broken from the stem, is covered and protected from premature lye penetration. Experience has shown that cold lye or alkaline salt solutions have little effect on the wax of the olive unless the pH is such as to cause the cold lye or alkaline salt to penetrate the flesh, which however, is not desired.

In the first step of my process, that of removing the wax, the hot solution is effective at low concentrations of lye or alkaline salt and the flesh of the olive is not penetrated. However, the temperatures must be maintained at a point low enough to prevent damage to the texture or skin or flesh of the olive and still high enough to prevent bacterial spoilage. So far as time treatment is concerned, this, of course, will vary with temperature and concentration of the alkaline solution to remove or saponify the cutinal wax. I have used from four to twenty-four hours although I have found that six to eight hours is convenient, however, time is not too material beyond the approximate four hour minimum period. Concentration of the solution may vary widely according to the alkali used. Thus, I may employ caustic soda (sodium hydroxide), sodium tri-poly-phosphate; sodium-tetra-pyro-phosphate, tri-sodium phosphate, sodium carbonate, borax, lime, sodium silicate, sodium-meta-silicate, sodium hexameta-phosphate, and various and other agents as useful adjuncts or substitutes, to name but a few. In the majority of the chemical agents, as long as I maintain a certain pH, the quantity of the agents in solution may vary as I have previously indicated, that is, four grams per gallon of solution in the majority of cases. However, the pH would be determined in each instance so that the desired pH, to wit: 12 in initial operation should be maintained although this pH is reduced to 9 or 10 during the heating. I may, if desired, employ a chemical sequestering agent. Such an agent is sold under the trade name "Versene." Versene is a sodium salt of ethylene diamine-tetra-acetic acid. This chemical is used in detergent formulations designed to produce stable, water-soluble complex compounds which may be washed away in large volumes of water.

The air is used during this treatment for the purpose of obtaining maximum penetration of air into the tissues of the olives and, of course, to mechanically stir and rub the olives for the even removal of wax.

Experience has shown that following the steps just indicated in the treatment of the olives which is step one, that the air penetrates approximately $\frac{1}{16}''$ into the olive flesh coloring the olives uniformly to a reddish brown. In place of air, I may, of course, use oxygen.

The second step is the first lye treatment which colors the olives and during this first lye treatment, the air or oxygen which is also being injected into the solution combines with the tannin and related pigments in the olive and the bitter principal of the olive flesh react to give a deep brown pigment. The first lye treatment, which I sometimes designate as the first color lye treatment, constitutes a solution of from 1% to 3% lye with a solution temperature from 70° to 80° F. I may use the chemicals previously mentioned for lye such as sodium hydroxide. In the first treatment which is adapted to remove the wax, the lye solution is discarded. However, when the first color lye treatment is utilized after rinsing the olives following the wax removing step, the olives are rinsed in clear water and then placed in the solution of lye which may be sodium hydroxide. In this first color lye treatment I have found that the higher the temperature of the solution, the more even the cuts and the stronger the lye solution the more even the action on the skin and flesh, up to the point of damage to skin or flesh. However, temperature and concentration of lye may be varied. A period of time from thirty minutes to an hour is about the average within the limits noted for the lye strength and temperature and one hundred percent of the olives are usually penetrated by the first lye to some extent under the skin. This penetration amounts from $\frac{1}{64}''$ to $\frac{1}{8}''$ in depth. The effect of this treatment is illustrated in FIGURE 3 in which the penetration area 1 indicates the depth to which the lye has penetrated through the skin and into the flesh of the olive. Following the first color lye treatment the olives are rinsed in clear water. However, the lye solution is retained; i.e., it may be withdrawn from the tank for further use. After the rinsing operation, the olives are placed in an acidified water having a pH of 2 to 3. The water may be acidified by any suitable acid such as sulphuric which has been found to work satisfactory and not impair the natural flavor of the olive. Furthermore, it has been found that this acid allows more calcium in the form of a sulphate to remain in the solution, and of course, calcium is natural to water or is added in the case of soft water. This calcium is necessary, at least helpful, as it combines with the pectins of the tissue cell and helps maintain a firm texture during the curing of the olives. It has been noted that better color retention in the olive is effected when calcium or magnesium is added to the water after lye and air exposures. This may be due to direct chemical combination of the calcium to form an insoluble color pigment with the tannins and related pigments of phenolic character. Too much calcium, however, results in a hard inedible texture with the result that I prefer to limit the use of calcium if it must be added to the water to about 500 to 1000 p.p.m. I use a minimum of calcium and still obtain by my process a black color in the olive which is due to nearly one hundred percent of the natural color present in the olive producing a pigment which is stable and is not dissolved or leached out in the washing and brining period, but is obtained just under the skin, which gives a dark surface with light meat.

The pH of the solution, that is, 2 to 3 (and even up to 4) with the olives in the solution is maintained for several hours followed by allowing the pH to gradually increase to 7 while still maintaining air circulation which may require a period of sixteen to seventeen hours. The exposure to air or oxygen in solution aids in maximum color development and retention.

Development of color in the olive flesh seems to be maximum at the slightly alkaline range of pH 8 to 10. Since the lye in the tissue, after penetration, is about pH 12 to 13, it is necessary to establish a zone near the skin where air can reach the tissue with a pH of 8 to 10 as quickly and for as long a period as possible. I have found that an acid solution of pH 2 to 3 for the air exposure period establishes this condition due to neutralization of the lye in the fruit by the acid as it penetrates the skin slowly. With my process, exposure in acid solution leaches out no color firstly because the color is not soluble in acid, and secondly, the acid reacts with the wax-soap present on the surface after the first step of alkaline heating with air and forms a hydrolyzed wax, formed from the soap at low pH. This wax serves as a membrane barrier in connection with the olive skin and holds the large color molecules while allowing the lye to come out very slowly and allowing the acid to penetrate slowly. Tests on the water show a steady pH increase but no color removal. Thus, while the pH is kept at 2 to 3, or 4 by additions of a mineral acid, the pH may go to 7 or 8 toward the end of the exposure period, when the lye in the tissue is dissipated or neutralized and the color already formed by oxidation.

The next step in my process is the second lye treatment and if the process as described has been followed, the waxy coating of the olive persists through this second lye treatment which is used to insure some penetration on the olives which were not cut deep enough in the first lye treatment to become properly colored. The second lye treatment using the chemicals and the percentage indicated before may be for a period of from 15 to 30 or more minutes followed by removing the olives from the lye solution while retaining the lye solution for further use, rinsing and then placing the olives in acidified water and plenty of air. This second acidified water exposure having the same pH as indicated before, to wit: 2, 3 or 4, while bubbling air or oxygen through the solution, is proceeded with from 12 to 18 hours. The olive coating which is readily penetrated by strong lye again becomes greasy and retains color developed in the second exposure. This is illustrated by the dark area 2 for the olive in FIGURE 4.

The last or "pit" lye usually has a 1.5% to 2% concentration and for this purpose the first and second lyes which were discarded and retained, may be utilized. This lye will penetrate to the pit of all olives as indicated for the area 3 in FIGURE 5. The pit in each instance for the several figures, is designated by the letter p. I effect a saving of lye solution by retaining the lye solutions and reusing the same after fortification and I have also found that strong lyes have advantage over weak ones since they remain on the olives less time and therefore, have less chance of leaching out valuable color or color base materials. They also promote even penetration and a more uniform color.

After penetration of the lyes to the pit, the olives are removed from the solution and rinsed in water followed by placing the olives in an acidified solution for 12 hours or more changing the solution every 3 hours while maintaining the pH under 7. Also the temperature is maintained provided it has any tendency to drop below 70° F. When only a trace of lye remains, the acidified water with the olives therein is progressively heated from first 120° F. to 140° F. and finally from 160° F. to 180° F. The progressive heating periods during wash is to allow time for the lye to be removed from resistent olives, before the temperature becomes high enough to destroy the texture. If the water pH is over 8, acid is added. Following this heat treatment, the olives are placed in a 2.5% salt brine solution and the solution then heated to 180° F. to pasteurize the olives. From this point on the olives may be canned. I have found in certain instances that it is expedient and desirable to run the olives over a pin board to hasten lye removal before washing. My entire process only requires 48 hours of time for the lye penetration and color oxidation of development part of the process.

It is to be noted that in my process many of the difficulties now encountered by present processes are eliminated. One of the chief factors of elimination is the fact that the color in the olive is not washed therefrom or leached. Faster curing, as accomplished by my process, eliminates incipient spoilage which is always present in any process. Conventional processes allow many olives to be untouched by lye for many days while the protective salt and lactic acid are leached out in the water and spoilage may start. Any trace of spoilage flavor is transmitted at once to the oil in the olives thus damaging and ruining the natural bland flavor in proportion to the degree of spoilage.

In FIGURES 1 and 2 I have illustrated a vat which is particularly efficient in the processing of new ripe olives and while any of the standard vats now in general use may be utilized in the carrying out of my process as previously described, still I have found that the new type vat aids in the efficiency of the process.

In FIGURE 1, I have shown a battery of tanks at 10, 11, 12 and 13, by way of example. I am not limited as to the number of tanks or their arrangement; that is to say, the tanks may be arranged in side by side parallel relationship and in alignment. The one noticeable feature is saving of space. As is evident, I have four tanks 10 to 13 in the space that would normally be occupied by a single tank if it occupied a horizontal plane. Each tank is similarly constructed and I use the term "tank" in the sense of a vat. As shown in FIGURE 2, the tanks such as 10 are rectangular shaped and have a top and a bottom wall 14, 15, end walls 16 and 17 and side walls 18 and 19 which, of course, join the top and bottom walls as well as the end walls. However, the tanks or vats may be of any other shape or cross-section such as circular, elliptical, trianguar, hexagonal, etc. Preferably, the tanks are long in proportion to width; i.e., I may provide by way of example a two foot diameter tube which may be of any length desired, say twenty feet, or even greater lengths such as forty to sixty feet. Each tank or vat is placed at an angle as shown in FIGURE 1. This angle to horizontal is not critical although I have found that an angle of 30° to 40° to horizontal performs efficiently. Within the vat or tank in each instance, I provide a partition 18 which extends substantially the length of the tank and is secured between the side walls 19 and 19a thereof. The top and bottom edges of the partition wall 18 are spaced inwardly from the top and bottom walls 16 and 17 of the vat or tank. In actual practice I have found a spacing of 6" to 8" between the top and bottom edges of the partition from the top and bottom walls 16 and 17 quite satisfactory. Also, I may space the partition nearer to the top wall 14 of the vat or tank than to the bottom wall, although this is not absolutely essential nor is it essential that the partition be used although the results obtained are better when the partition is used. Within the tank and included between the end wall 17 and the bottom wall 15 and substantially on a horizontal plane, is a screen 19b. A pipe 20 leading to a source of air or oxygen supply carries fittings such as shown at 21 connecting branch pipes 22 leading within each tank or vat and below the screen 19b, as shown in FIGURE 2. There are provided valved branch pipes 23 connecting with a main drain pipe 24, the valved branch pipes leading to the area of the vats or tanks beneath the said screens 19b. No particular type of support is intended for holding the vats or tanks although I may provide the supporting structure shown in FIGURE 1 for this purpose. Thus the base member of a tank lies on the top member of a succeeding tank, the entirety being held at the selected angle to horizontal by supports such as shown at 25 and 26, as well as the foundation supports at 27 and 28.

The advantage of this type of vat or tank is its ability to increase capacity by extending the length thereof without increasing the weight on the olives. When the tank is filled with a lye solution or other solution as previously described for carrying out my process, air is injected at the bottom of the tank and the air rises to the top of the tank, thus olives within the solution as shown, for instance, at 29, move downwardly under gravity, while the air directed into the tank at the bottom thereof causes a complete circulatory movement of not only the solution but of the olives as well, as indicated by the arrow 30, while maintaining the olives completely immersed. This form of tank or vat assures that all olives are equally treated and so-called floaters are held by the olives there-above within the solution so that they are properly washed and treated. By limiting the diameter or the width of the vat, and by maintaining the same at an angle, the total weight of fruit will never exceed the weight of about 30" of depth of olives, when standing dry, between water changes, and thus I avoid the trouble encountered with over-ripe or soft fruit in deep tanks. The top 16 is removable and hence, emptying olives from the vats with air into tanks on trucks becomes a simple operation. No particular material is contemplated for the construction of the vats or tanks although I may use cement, fibreglass, steel, stainless steel, wood, etc.

I claim:

1. The process of treating ripe olives consisting of: placing the olives in an alkaline solution having an initial pH of substantially 12 and a solution temperature between 120° to 140° F. for a period of four to twenty-four hours; stirring the solution by air injection to remove in part and to distribute evenly the cutinal wax on the olives, removing the olives from the alkaline solution and rinsing the olives followed by a first color lye treatment by placing the rinsed olives in an aerated 1% to 3% lye solution at a solution temperature between 70° to 80° F., thereafter rinsing the olives and placing the rinsed olives in acidified water having a pH between 2 and 3, then gradually increasing the pH to 7 while maintaining air circulation therein; then repeating the first named color lye treatment followed by rinsing the olives.

2. The process of treating ripe olives by removing part of the cutinal wax by saponification and redistributing the hydrolyzed wax evenly over the olive skin without penetration of the olive flesh, consisting of: placing the olives in an alkaline solution having an initial pH of substantially 12, and a solution temperature between 120° and 140° F. while constantly stirring the solution and the olives by air injection for a time period of four to twenty-four hours, thereafter rinsing the olives then placing the olives in acidified water having a pH between 2 and 3 to turn the cutinal wax on the skin of the olives to a greasy, only partly permeable substance to prevent the color forming pigment of the olive from passing through the olive skin, followed by placing the olives in a 1% to 3% lye solution having a solution temperature between 70° to 80° F. and at the same time subjecting the solution to air injection to allow the air to penetrate the olives and the lye and the acid to pass through the olives slowly.

3. The process of treating ripe olives by removing part of the cutinal wax by saponification and redistributing the hydrolyzed wax evenly over the olive skin without penetration of the olive flesh, consisting of: placing the olives in an alkaline solution having an initial pH of substantially 12, and a solution temperature between 120° and 140° F. while constantly stirring the solution and the olives by air injection for a time period of four to twenty-four hours, thereafter rinsing the olives and placing the olives in an aerated acidified water having a pH of 2 to 3 to maintain the cutinal wax coating of the olives impermeable to the passage of color pigments therethrough, then removing the olives from the acidified water and placing the olives in a 1 to 3% lye solution having a temperature of 70° to 80° F. while subjecting the solution to air injection.

References Cited in the file of this patent

UNITED STATES PATENTS

| | | |
|---|---|---|
| 1,393,873 | Wolf | Oct. 18, 1921 |
| 1,621,188 | Beckman | Mar. 15, 1927 |
| 1,625,494 | Olivarius | Apr. 19, 1927 |
| 2,464,947 | Sammis et al. | Mar. 22, 1949 |
| 2,582,371 | Ball et al. | Jan. 15, 1952 |
| 2,805,951 | Kagley et al. | Sept. 10, 1957 |